United States Patent
Kim et al.

(10) Patent No.: US 11,731,123 B2
(45) Date of Patent: Aug. 22, 2023

(54) METHOD OF PREPARING SUPPORTED METALLOCENE CATALYST AND METHOD OF PREPARING POLYPROPYLENE USING CATALYST PREPARED THEREBY

(71) Applicant: LG Chem, Ltd., Seoul (KR)

(72) Inventors: Byung Seok Kim, Daejeon (KR); Insun Lee, Daejeon (KR); Seok Hwan Kim, Daejeon (KR); Hye Kyung Lee, Daejeon (KR); Heekwang Park, Daejeon (KR); Daesik Hong, Daejeon (KR); Sangjin Jeon, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/942,559

(22) Filed: Sep. 12, 2022

(65) Prior Publication Data

US 2023/0023983 A1    Jan. 26, 2023

Related U.S. Application Data

(62) Division of application No. 16/957,270, filed as application No. PCT/KR2018/015933 on Dec. 14, 2018, now Pat. No. 11,504,706.

(30) Foreign Application Priority Data

Dec. 26, 2017  (KR) .................. 10-2017-0180263
Dec. 13, 2018  (KR) .................. 10-2018-0161297

(51) Int. Cl.
C08F 2/38      (2006.01)
B01J 37/04     (2006.01)
C08F 4/6592    (2006.01)
C08F 10/06     (2006.01)

(52) U.S. Cl.
CPC .......... B01J 37/04 (2013.01); C08F 4/65927 (2013.01); C08F 10/06 (2013.01)

(58) Field of Classification Search
None
See application file for complete search history.

(56) References Cited

U.S. PATENT DOCUMENTS

| | | | |
|---|---|---|---|
| 5,278,264 A | 1/1994 | Spaleck et al. | |
| 5,998,643 A | 12/1999 | Jordan et al. | |
| 6,051,727 A | 4/2000 | Kuber et al. | |
| 6,900,343 B1 | 5/2005 | Bingel et al. | |
| 2006/0020096 A1 | 1/2006 | Schottek et al. | |
| 2006/0252637 A1 | 11/2006 | Okumura | |
| 2010/0274035 A1 | 10/2010 | Muller et al. | |
| 2014/0018506 A1 | 1/2014 | Resconi et al. | |
| 2014/0206819 A1 | 7/2014 | Hafner et al. | |
| 2015/0329653 A1 | 11/2015 | Resconi et al. | |
| 2016/0208028 A1 | 7/2016 | Choi et al. | |
| 2017/0037165 A1 | 2/2017 | Ajellal et al. | |
| 2017/0137343 A1 | 5/2017 | Castro et al. | |

FOREIGN PATENT DOCUMENTS

| | | |
|---|---|---|
| CN | 105555811 A | 5/2016 |
| EP | 1636245 A1 | 3/2006 |
| EP | 1963339 A1 | 9/2008 |
| JP | H07188318 A | 7/1995 |
| JP | H11279189 A | 10/1999 |
| JP | 2001011087 A | 1/2001 |
| JP | 2001114795 A | 4/2001 |
| JP | 2001253906 A | 9/2001 |
| JP | 2002530414 A | 9/2002 |
| JP | 2003533550 A | 11/2003 |
| JP | 2009527380 A | 7/2009 |
| JP | 2016504452 A | 2/2016 |
| KR | 100283824 B1 | 4/2001 |
| KR | 20140007360 A | 1/2014 |
| KR | 20140053992 A | 5/2014 |
| KR | 20150146101 A | 12/2015 |
| KR | 20160147835 A | 12/2016 |
| KR | 20170039504 A | 4/2017 |
| WO | 9619488 A1 | 6/1996 |
| WO | 2004106351 A1 | 12/2004 |
| WO | 2007071370 A1 | 6/2007 |

OTHER PUBLICATIONS

International Search Report from Application No. PCT/KR2018/015933 dated Apr. 3, 2019, 2 pages.
Extended European Search Report including Written Opinion for Application No. EP18896596.6 dated Jan. 28, 2021, 9 pgs.
Nifant'Ev et al., "Asymmetric ansa-Zirconocenes Containing a 2-Methyl-4-aryltetrahydroindaceneeeeeeee Fragment: Synthesis, Structure, and Catalytic Activity in Propylene Polymerization and Copolymerization", Organometallics, Nov. 2011, vol. 30, No. 21, pp. 5744-5752.
Search Report dated Jun. 25, 2022 from Office Action for Chinese Application No. 201880084270.1 dated Jul. 1, 2022. 3 pgs.

*Primary Examiner* — Yun Qian
(74) *Attorney, Agent, or Firm* — Lerner David LLP

(57) ABSTRACT

Provided are a method of preparing a supported metallocene catalyst, and a method of preparing polypropylene using the catalyst prepared thereby. According to the present invention, provided is a supported metallocene catalyst capable of preparing an isotactic polypropylene polymer having a low xylene soluble content while having excellent catalytic activity.

4 Claims, No Drawings

METHOD OF PREPARING SUPPORTED METALLOCENE CATALYST AND METHOD OF PREPARING POLYPROPYLENE USING CATALYST PREPARED THEREBY

CROSS-REFERENCE TO RELATED APPLICATIONS

This application is a divisional application of application Ser. No. 16/957,270 filed on Sep. 16, 2020, a national phase entry under 35 U.S.C. § 371 of International Application No. PCT/KR2018/015933 filed Dec. 14, 2018, which claims priority from Korean Patent Application No. 10-2017-0180263 filed Dec. 26, 2017, and Korean Patent Application No. 10-2018-0161297 filed Dec. 13, 2018, all of which are incorporated herein by reference.

BACKGROUND OF THE INVENTION

(a) Field of the Invention

The present invention relates to a method of preparing a supported metallocene catalyst, and a method of preparing polypropylene using the catalyst prepared thereby.

(b) Description of the Related Art

Catalysts for olefin polymerization may be classified into Ziegler-Natta catalysts and metallocene catalysts, and these two catalysts have been developed in compliance with their characteristics.

A Ziegler-Natta catalyst has been widely applied to existing commercial processes since it was developed in the 1950's. However, since the Ziegler-Natta catalyst is a multi-active site catalyst in which a plurality of active sites are mixed, a polymer prepared by using the same has a broad molecular weight distribution. Also, since comonomer compositional distribution is not uniform, it has a limitation to secure the desired physical properties. In particular, since polypropylene prepared using Ziegler-Natta catalysts has a high xylene soluble content (e.g., more than 5% by weight), there is a limitation in that it is difficult to obtain polypropylene having a low melting point (Tm) when Ziegler-Natta catalysts are used.

The metallocene catalyst includes a combination of a main catalyst, of which main component is a transition metal compound, and a cocatalyst, of which main component is aluminum. Such a catalyst is a single-site catalyst which is a homogeneous complex catalyst. Therefore, the metallocene catalyst allows preparation of polypropylene having a narrow molecular weight distribution and a uniform comonomer compositional distribution. Further, the metallocene catalyst has characteristics capable of changing the stereoregularity, copolymerization properties, molecular weight, degree of crystallinity, etc. of polypropylene by changing a ligand structure and polymerization conditions.

Among them, an ansa-metallocene catalyst is an organometallic catalyst including two ligands which are linked to each other via a bridge group. The bridge group prevents rotation of the ligands and determines the activity and structure of the metal center. Particularly, in the polymerization of polypropylene, the ansa-metallocene catalyst may form a polymer having a low xylene soluble content, and thus it is advantageous in preparing polypropylene having a low melting point.

Meanwhile, during preparation of the ansa-metallocene catalyst, a racemic form and a meso isomer are produced at the same time. Thus, to prepare an isotactic polymer having high crystallinity and melting point and high specific gravity and mechanical strength, it is required to separate a metallocene compound of a racemic form with high-purity from a mixture of the meso isomer and the racemic form.

However, the racemic form and meso isomer show no great difference in solubility for a general recrystallization solvent, and thus it is not easy to separate a pure racemic form.

Accordingly, there is a demand for the development of a method capable of obtaining a metallocene compound of a racemic form with high-purity in a simpler manner than the existing methods.

SUMMARY OF THE INVENTION

The present invention provides a method of preparing a catalyst including a metallocene compound of a racemic form with high-purity in order to provide a supported metallocene catalyst which allows polymerization of a desired isotactic polypropylene having high stereoregularity.

Further, the present invention provides a method of preparing polypropylene using the supported metallocene catalyst.

According to the present invention, provided is a method of preparing a supported metallocene catalyst, the method including the steps of:

preparing a mixture of a racemic form of the following Chemical Formula 1 and a meso isomer of the following Chemical Formula 2;

dissolving the mixture in a solvent including toluene and hexane;

filtering the mixture dissolved in the solvent to remove the solidified meso isomer of Chemical Formula 2; and removing the solvent from the filtered mixture, and then supporting the resulting product onto a carrier:

[Chemical Formula 1]

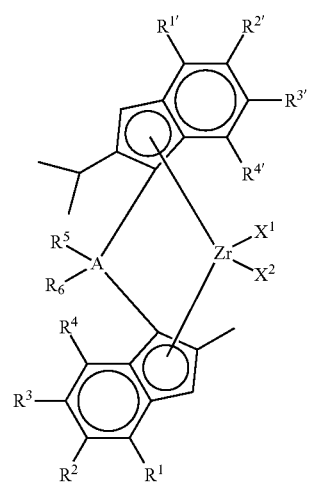

-continued

[Chemical Formula 2]

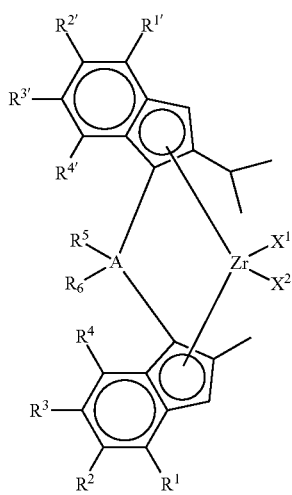

in Chemical Formulae 1 and 2, $X^1$ and $X^2$ are each independently halogen, $R^1$ and $R^{1\prime}$ are each independently an aryl group having 6 to 20 carbon atoms which is substituted with an alkyl group having 1 to 20 carbon atoms, $R^2$, $R^3$, $R^4$, $R^{2\prime}$, $R^{3\prime}$, and $R^{4\prime}$ are each independently hydrogen, halogen, an alkyl group having 1 to 20 carbon atoms, an alkenyl group having 2 to 20 carbon atoms, an alkoxy group having 1 to 20 carbon atoms, an aryl group having 6 to 20 carbon atoms, an alkylaryl group having 7 to 20 carbon atoms, or an arylalkyl group having 7 to 20 carbon atoms, A is carbon, silicon, or germanium, and $R^5$ and $R^6$ are each independently an alkyl group having 1 to 20 carbon atoms.

Further, according to the present invention, provided is a method of preparing polypropylene, the method including the step of polymerizing monomers including propylene in the presence of the supported metallocene catalyst.

According to the method of preparing the supported metallocene catalyst according to the present invention, it is possible to prepare a supported metallocene catalyst including a high-purity racemic form in a simpler manner.

Accordingly, when the supported metallocene catalyst prepared by the method is used, it is possible to prepare an isotactic polypropylene polymer having a low xylene soluble content while exhibiting excellent catalytic activity.

DETAILED DESCRIPTION OF THE EMBODIMENTS

Unless otherwise described throughout the specification, technical terms are to address specific embodiments, and are not intended to limit the present invention.

Also, singular forms used herein include plural forms unless they have explicitly contrary meanings. Further, the term 'including' used herein specifies properties, areas, integers, steps, operations, elements, and/or ingredients, but does not exclude the presence or addition of other properties, areas, integers, steps, operations, elements, ingredients, and/or groups.

As used herein, the term "racemic form" means that the substituents on the two cyclopentadienyl moieties exist on the opposite side with respect to the plane containing zirconium and the center of the cyclopentadienyl moieties.

As used herein, the term "meso isomer", which is a stereoisomer of a racemic form, means that the substituents on the two cyclopentadienyl moieties exist on the same side with respect to the plane containing zirconium (Zr) and the center of the cyclopentadienyl moieties.

According to one embodiment of the present invention, provided is a method of preparing a supported metallocene catalyst, the method including the steps of:

preparing a mixture of a racemic form of the following Chemical Formula 1 and a meso isomer of the following Chemical Formula 2;

dissolving the mixture in a solvent including toluene and hexane;

filtering the mixture dissolved in the solvent to remove the solidified meso isomer of Chemical Formula 2; and removing the solvent from the filtered mixture, and then supporting the resulting product onto a carrier:

[Chemical Formula 1]

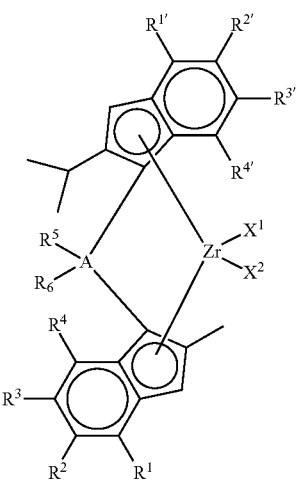

[Chemical Formula 2]

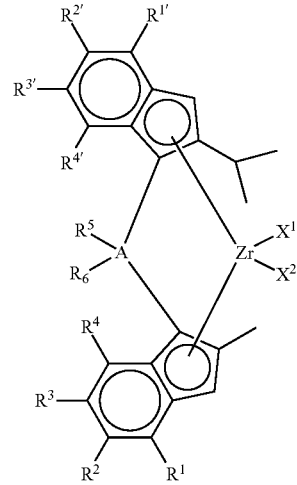

in Chemical Formulae 1 and 2, $X^1$ and $X^2$ are each independently halogen, $R^1$ and $R^{1\prime}$ are each independently an aryl group having 6 to 20 carbon atoms which is substituted with an alkyl group having 1 to 20 carbon atoms, $R^2$, $R^3$, $R^4$, $R^{2\prime}$, $R^{3\prime}$, and $R^{4\prime}$ are each independently hydrogen, halogen, an alkyl group having 1 to 20 carbon atoms, an alkenyl group having 2 to 20 carbon atoms, an alkoxy group having 1 to 20 carbon atoms, an aryl group having 6 to 20 carbon atoms, an alkylaryl group having 7 to 20 carbon atoms, or an arylalkyl group having 7 to 20 carbon atoms, A is carbon, silicon, or germanium, and $R^5$ and $R^6$ are each independently an alkyl group having 1 to 20 carbon atoms.

The metallocene compound of Chemical Formula 1 has an ansa-metallocene structure including two indenyl groups as ligands, and includes zirconium (Zr) as a metal atom, thereby exhibiting high catalytic activity.

Further, since the ligands are substituted by bulky groups ($R^1$ and $R^{1\prime}$), a steric hindrance is provided, and thus formation of the metallocene compound of the meso isomer may be basically prevented during synthesis of the catalyst. However, it is difficult to inhibit the formation of the meso isomer below 30 mol %.

However, as explained above, since the metallocene compound of the meso isomer forms an atactic polypropylene, it is necessary to purify only the metallocene compound of the racemic form with high-purity in order to prepare the isotactic polypropylene.

A basic method of separating the racemic form from the meso isomer is to separate the racemic form by solidify the racemic form through recrystallization using a solubility difference, focusing on the fact that the racemic form generally has poorer solubility than the meso isomer. However, with regard to the metallocene compound of Chemical Formula 1, the racemic form and the meso isomer show no great difference in solubility for DCM (dichloromethane) which is generally used as a recrystallization solvent, and therefore, it is not easy to isolate the pure racemic form. Further, a considerable amount of the racemic form also exists in the filtrate remaining after removing the solidified racemic form, and thus there is a problem in that the overall yield is low.

Accordingly, the present inventors have found conditions under which the racemic form shows higher solubility than the meso isomer. Under these conditions, the mixture of the racemic form and the meso isomer is dissolved (recrystallized) to separate the racemic form in a liquid form and to remove the meso isomer in a solid form, and as a result, the racemic form may be isolated in high purity by purification, thereby completing the present invention.

Hereafter, the method of preparing the supported metallocene catalyst of the present invention will be described in more detail.

First, the metallocene mixture including the racemic form of the following Chemical Formula 1 and the meso isomer of the following Chemical Formula 2 is prepared.

[Chemical Formula 1]

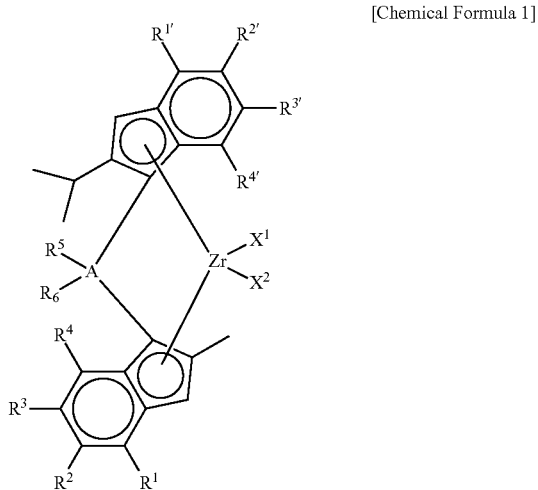

[Chemical Formula 2]

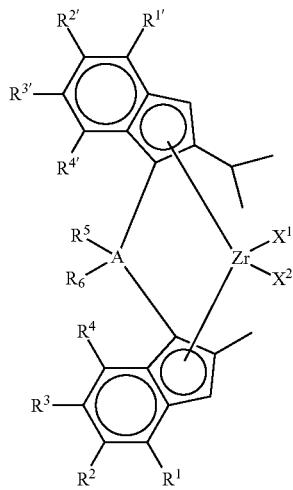

in Chemical Formulae 1 and 2, $X^1$ and $X^2$ are each independently halogen, $R^1$ and $R^{1\prime}$ are each independently an aryl group having 6 to 20 carbon atoms which is substituted with an alkyl group having 1 to 20 carbon atoms, $R^2$, $R^3$, $R^4$, $R^{2\prime}$, $R^{3\prime}$, and $R^{4\prime}$ are each independently hydrogen, halogen, an alkyl group having 1 to 20 carbon atoms, an alkenyl group having 2 to 20 carbon atoms, an alkoxy group having 1 to 20 carbon atoms, an aryl group having 6 to 20 carbon atoms, an alkylaryl group having 7 to 20 carbon atoms, or an arylalkyl group having 7 to 20 carbon atoms, A is carbon, silicon, or germanium, and $R^5$ and $R^6$ are each independently an alkyl group having 1 to 20 carbon atoms.

According to one embodiment of the present invention, in Chemical Formulae 1 and 2, $X^1$ and $X^2$ may be each independently halogen, and preferably, Cl.

In Chemical Formulae 1 and 2, $R^1$ and $R^{1\prime}$ may be each independently an aryl group having 6 to 20 carbon atoms which is substituted with an alkyl group having 1 to 20 carbon atoms, preferably a phenyl group substituted with tert-butyl, and more preferably, a 4-tert-butyl phenyl group.

In Chemical Formulae 1 and 2, $R^2$, $R^3$, $R^4$, $R^{2\prime}$, $R^{3\prime}$, and $R^{4\prime}$ may be each independently preferably hydrogen or an alkyl group having 1 to 20 carbon atoms, and more preferably, hydrogen.

In Chemical Formulae 1 and 2, A may be carbon, silicon, or germanium, and preferably silicon.

In Chemical Formulae 1 and 2, $R^5$ and $R^6$ may be each independently an alkyl group having 1 to 20 carbon atoms, and preferably a methyl group.

According to one embodiment of the present invention, a representative example of the racemic form compound of Chemical Formula 1 is as follows:

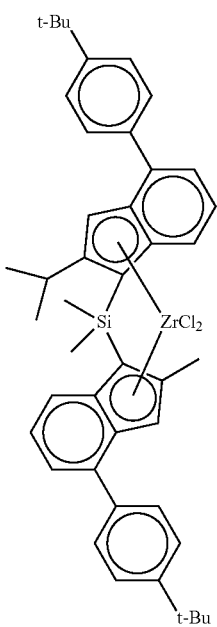

A representative example of the meso isomer compound of Chemical Formula 2 is as follows:

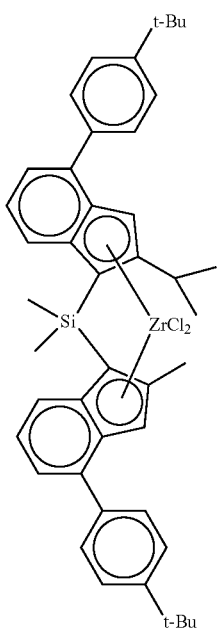

The metallocene mixture including the racemic form of Chemical Formula 1 and the meso isomer of Chemical Formula 2 may be prepared by the following method, and the present invention is not limited thereto.

First, a compound of the following Chemical Formula 1-2 is reacted with a compound of the following Chemical Formula 1-3 to prepare a compound of Chemical Formula 1-4. This reaction may be performed using alkyl lithium (e.g., n-butyl lithium) as a catalyst at a temperature of −200° C. to 0° C.

Next, the compound of the following Chemical Formula 1-4 is reacted with the compound of the following Chemical Formula 1-5 to prepare a compound of Chemical Formula 1-6. This reaction may be performed using alkyl lithium (e.g., n-butyl lithium) as a catalyst at a temperature of −200° C. to 0° C. At this time, an organic layer is separated from the product, and after vacuum-drying the separated organic layer, an excess of the reactant is preferably removed therefrom.

Next, the compound of the following Chemical Formula 1-6 is reacted with a compound of Chemical Formula 1-7. Through this reaction, a metallocene compound may be obtained in a mixture form of the racemic form of Chemical Formula 1 and the meso isomer of Chemical Formula 2.

[Chemical Formula 1-2]

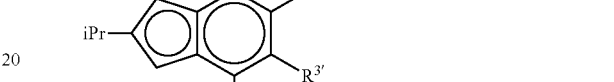

[Chemical Formula 1-3]

$Cl_2AR^5R^6$

[Chemical Formula 1-4]

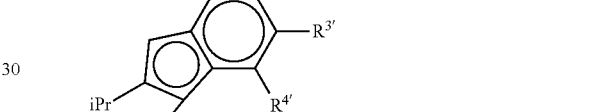

[Chemical Formula 1-5]

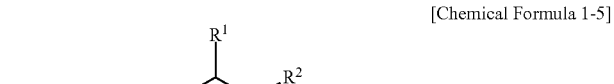

[Chemical Formula 1-6]

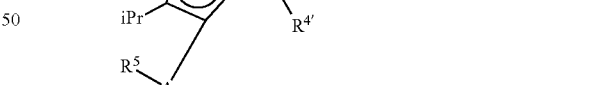

[Chemical Formula 1-7]

$Cl_2ZrRX^1X^2$ in Chemical Formulae 1-2 to 1-7, $X^1$, $X^2$, A, $R^1$, $R^{1'}$ $R^2$, $R^3$, $R^4$, $R^{2'}$, $R^{3'}$, $R^{4'}$, $R^5$ and $R^6$ are defined as in Chemical Formulae 1 and 2.

A molar ratio (rac:meso) of the racemic form of Chemical Formula 1 to the meso isomer of Chemical Formula 2 in the mixture may be, but vary depending on the reaction conditions, about 1:1 to about 3:1, and it is difficult to increase the molar ratio of the racemic form more than the above in the synthesis step.

Next, the mixture is dissolved in a solvent including toluene and hexane.

A weight ratio of toluene and hexane may be 1:0.01 to 1:100, 1:0.1 to 1:10, or 1:0.5 to 1:2.

Further, a dissolution temperature may be in the range of −78° C. or higher, −30° C. or higher, or −25° C. or higher, and 70° C. or lower, 60° C. or lower, or 25° C. or lower, preferably −30° C. or higher and 70° C. or lower, preferably −25° C. or higher and 70° C. or lower, and more preferably −25° C. or higher and 60° C. When the dissolution temperature is within the above range, the molar ratio of the racemic form to the meso isomer may be further increased.

Further, the dissolution may be performed for 1 hr or longer, 24 hr or longer, or 48 hr or longer, and 128 hr or shorter, 96 or shorter, 72 or shorter, or 60 or shorter.

Further, concentrations of toluene and hexane may be each independently 0.05 M or more, 0.1 M or more, or 0.2 M or more, and 2.0 M or less, 1.5 M or less, 1.0 M or less, or 0.5 M or less.

Further, the mixture may be dissolved by mixing the mixture with toluene and hexane, sequentially or simultaneously.

When the mixture is sequentially dissolved in toluene and hexane, toluene is first added to the mixture, and sequentially, hexane is added thereto such that the mixture may be dissolved at a temperature lower than the dissolution temperature of toluene. As described, by simultaneously applying the temperature drop method and the solvent usage method of using a dissolution difference between solvents, in which toluene is first added to dissolve the mixture, and then at the lower temperature, hexane is added to dissolve the mixture, it is possible to expect a recrystallization effect of further increasing the molar ratio of the racemic form.

According to one embodiment of the present invention, toluene is first added to dissolve the mixture at a temperature of 30° C. to 70° C., or 40 to 70° C. for 0.1 hr to 3 hr, and then hexane is added to dissolve the mixture at a temperature of −30° C. to 30° C., or −25° C. to 25° C. for 6 hr to 96 hr.

According to one embodiment of the present invention, when the weight ratio of the toluene and hexane solvents, and the dissolution temperature and time satisfy the above range, the solubility of the racemic form relative to the meso isomer is further increased, thereby obtaining the racemic form with higher purity.

In other words, when the mixture is dissolved under the above conditions, the racemic form exhibits much higher solubility than the meso isomer. As a result, in the mixture which is dissolved in the solvent including toluene and hexane, the molar ratio (rac:meso) of the racemic form to the meso isomer may be 7 or more, 8 or more, or 9 or more, and 30 or less, 25 or less, 20 or less, or 18 or less, and the content of the racemic form may be greatly increased, and the meso isomer having relatively low solubility may be precipitated in a solid form.

Further, according to one embodiment of the present invention, the step of dissolving the mixture of racemic form/meso isomer in the solvent including toluene and hexane may be performed twice or more. When the dissolving step is performed twice or more, the molar ratio of the racemic form to the meso isomer may be further increased in the second dissolution step, because the molar ratio of the racemic form to the meso isomer has been already increased in the previous dissolution step.

Next, the mixture dissolved in the solvent is filtered using a filter, etc., thereby removing the solidified meso isomer of Chemical Formula 2. From the mixture from which the solidified meso isomer is removed, the solvent including toluene and hexane is removed by distillation under reduced pressure, thereby obtaining a metallocene catalyst having a much higher content of the racemic form of Chemical Formula 1. Thereafter, the metallocene catalyst having a higher content of the racemic form is dissolved in a non-polar solvent such as hexane, heptane, or pentane, and impurity is additionally removed by filtration using a filter, etc., thereby finally obtaining a high-purity racemic form.

Subsequently, the metallocene catalyst is supported on a carrier according to a common supporting method.

As the carrier, a carrier containing a hydroxyl group on its surface may be used. Specifically, the carrier may be a carrier containing a highly reactive hydroxyl group or siloxane group, of which the surface is dried and removed of moisture. For non-limiting example, the carrier include silica, silica-alumina, and silica-magnesia dried at a high temperature. The carrier may include oxides such as $Na_2O$, carbonates such as $K_2CO_3$, sulfates such as $BaSO_4$, and nitrate components such as $Mg(NO_3)_2$.

According to one embodiment of the present invention, the supported metallocene catalyst may further include one or more cocatalysts selected from the group consisting of compounds represented by the following Chemical Formulae 3 to 5, in addition to the metallocene compound:

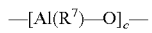   [Chemical Formula 3]

in Chemical Formula 3,
c is an integer of 2 or more,
$R^7$ is each independently halogen, a hydrocarbyl group having 1 to 20 carbon atoms, or a halogen-substituted hydrocarbyl group having 1 to 20 carbon atoms;

   [Chemical Formula 4]

in Chemical Formula 4,
D is aluminum or boron,
$R^8$ is each independently halogen, a hydrocarbyl group having 1 to 20 carbon atoms, or a halogen-substituted hydrocarbyl group having 1 to 20 carbon atoms;

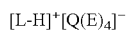   [Chemical Formula 5]

in Chemical Formula 5,
L is a neutral Lewis base,
$[L-H]^+$ is a Bronsted acid,
Q is boron or aluminum in the oxidation state of +3, and
E is each independently an aryl group having 6 to 20 carbon atoms or an alkyl group having 1 to 20 carbon atoms, in which one or more hydrogen atoms are substituted or unsubstituted with halogen, a hydrocarbyl group having 1 to 20 carbon atoms, an alkoxy or phenoxy functional group.

Specifically, the compound represented by Chemical Formula 3 may include alkylaluminoxane such as methylaluminoxane, ethylaluminoxane, butylaluminoxane, isobutylaluminoxane, etc. Further, the compound represented by Chemical Formula 3 may include modified methylaluminoxane (MMAO) obtained by replacing a part of methyl groups of the methylaluminoxane by other alkyl groups. For example, the modified methylaluminoxane may be a compound obtained by replacing 40 mol % or less, or 5 mol % to 35 mol % of methyl groups of the methylaluminoxane by a linear or branched alkyl group having 3 to 10 carbon atoms. Examples of the modified methylaluminoxane commercially available may include MMAO-12, MMAO-3A, MMAO-7, etc.

Further, the compound represented by Chemical Formula 4 may include trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, triisobutylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc.

Further, the compound represented by Chemical Formula 5 may include triethylammonium tetraphenylboron, tributylammonium tetraphenylboron, trimethylammonium tetraphenylboron, tripropylammonium tetraphenylboron, trimethylammonium tetra(p-tolyl)boron, tripropylammonium tetra(p-tolyl)boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentafluorophenylaluminum, triphenylphosphonium tetraphenylaluminum, trimethylphosphonium tetraphenylaluminum, triphenylcarbonium tetraphenylboron, triphenylcarbonium tetraphenylaluminum, triphenylcarbonium tetra(p-trifluoromethylphenyl)boron, triphenylcarbonium tetrapentafluorophenylboron, etc.

Specifically, as the cocatalyst, one or more compounds selected from the group consisting of trimethyl aluminum, triethyl aluminum, triisopropyl aluminum, triisobutyl aluminum, ethylaluminum sesquichloride, diethylaluminum chloride, ethyl aluminum dichloride, methylaluminoxane, and modified methylaluminoxane may be preferably applied.

Further, the content of the cocatalyst may be determined by considering catalytic activity, etc. According to one embodiment of the present invention, the cocatalyst may be included at a molar ratio of 1:1 to 1:10000, 1:1 to 1:5000, or 1:1 to 1:3000 with respect to the total weight of the metallocene compound.

Meanwhile, in this case, the supported metallocene catalyst may be prepared, in any order, by first supporting the cocatalyst onto the carrier, and then supporting the metallocene compound onto the cocatalyst-supported carrier, or by first supporting the metallocene compound onto the carrier, and then supporting the cocatalyst thereto.

In the preparation of the supported catalyst, a hydrocarbon solvent such as pentane, hexane, heptane, etc., or an aromatic solvent such as benzene, toluene, etc. may be used.

According to the preparation method as described, the content of the metallocene compound of the racemic form in the catalyst may be increased in a simpler manner, and when the supported metallocene catalyst prepared by supporting the same onto the carrier is used, it is possible to obtain a high-quality isotactic propylene polymer.

Meanwhile, according to another embodiment of the present invention, provided is a method of preparing polypropylene, the method including the step of polymerizing monomers including propylene in the presence of the supported metallocene catalyst prepared by the above preparation method.

The method of preparing polypropylene may be performed in the presence of the above-described supported metallocene catalyst using monomers including propylene as a raw material by applying a common device and contact technology.

For non-limiting example, the method of preparing polypropylene may be performed by homopolymerization of propylene or random polymerization of propylene and a comonomer using a continuous slurry polymerization reactor, a loop slurry reactor, a gas phase reactor, or a solution reactor. The comonomer may include ethylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, etc.

In the preparation method, the supported metallocene catalyst may be used in a state of being dissolved or diluted in a solvent such as pentane, hexane, heptane, nonane, decane, toluene, benzene, dichloromethane, chlorobenzene, etc.

Further, the method of preparing polypropylene may be performed at a temperature of 20° C. to 500° C. or 20° C. to 200° C. and a pressure of 1 kgf/cm$^2$ to 100 kgf/cm$^2$, or 1 kgf/cm$^2$ to 70 kgf/cm$^2$ for 1 hr to 24 hr, or 1 hr to 10 hr. As needed, the polymerization may be performed under conditions in which hydrogen is added thereto or not.

Further, the preparation method may be appropriately applied to the preparation of desired isotactic polypropylene.

Hereinafter, preferred examples will be provided for better understanding of the present invention. However, the following examples are provided only for illustrating the present invention, and the present invention is not limited thereby.

EXAMPLE

Preparation of Crude Mixture of Racemic Form and Meso Isomer

Synthesis Example 1

Preparation of (4-(4-(tert-butyl)phenyl)-2-isopropyl-1H-inden-1-yl)dimethyl(2-methyl-4-phenyl-1H-inden-1-yl) silane 2-iPr-4-tBuPhIndene (1 equiv) was dissolved in toluene/THF (10/1, 0.5 M), and then n-BuLi (1.05 eq) was slowly added thereto at −25° C., followed by stirring at room temperature for 3 hr. Thereafter, dichlorodimethyl silane (1.05 eq) was added at −10° C., followed by stirring at room temperature overnight. In another reactor, 2-Me-4-tBuPhIndene (1 eq) was dissolved in toluene/THF (5/1, 0.7 M), and then n-BuLi (1.05 eq) was slowly added at −25° C., followed by stirring at room temperature for 3 hr. Thereafter, CuCN (2 mol %) was added, followed by stirring for 30 min. Then, the first reactant mono-Si solution was added, followed by stirring at room temperature overnight. Work-up was performed using water, and then dried to obtain a ligand.

Preparation of dimethylsilanyl-(4-(4-tert-butylphenyl)phenyl)-2-methyl-1H-inden-1-yl)(4-(4-tert-butylphenyl)phenyl)-2-isoproyl-1H-inden-1-yl) zirconium dichloride (mixture of rac and meso)

The ligand was dissolved in toluene/ether (2/1, 0.53 M), and n-BuLi (2.05 eq) was added thereto at −25° C., followed by stirring at room temperature for 5 hr. A slurry of $ZrCl_4$ (1 eq) in toluene (0.17 M) was prepared and added to a flask, followed by stirring at room temperature overnight.

When the reaction was completed, the solvent was vacuum-dried, and DCM was added again and LiCl was removed through a filter, etc. the filtrate was vacuum-dried to obtain a metallocene compound in the form of a mixture of racemic form and meso isomer (rac:meso=2:1, a molar ratio).

$^1$H NMR (500 MHz, $CDCl_3$, 7.26 ppm) of Rac-dimethylsilanyl-(4-(4-tert-butylphenyl)phenyl)-2-methyl-1H-inden-1-yl)(4-(4-tert-butylphen yl)phenyl)-2-isoproyl-1H-inden-1-yl)zircoium dichloride: 0.89 (6H, t), 1.19 (3H, d), 1.34 (9H, s), 1.35 (9H, s), 1.47 (3H, d), 1.50 (3H, s), 2.38 (3H, s), 3.20 (1H, m), 6.88 (2H, m), 6.94 (2H, d), 7.14 (2H, d), 7.44 (4H, t), 7.52 (4H, d), 7.65 (2H, t)

Example 1

0.52 M toluene was added to 10 g of the mixture of Synthesis Example 1, and dissolved at 60° C. for 1 hr. Thereafter, 0.52 M hexane was added thereto, followed by stirring for 30 min. Then, the temperature was decreased to −25° C., and maintained for 72 hr. A supernatant was obtained by decantation, and a filter cake was separated through a filter. The supernatant and filtrate were collected together and vacuum-dried. After completing the solvent drying, a ratio of rac:meso was examined by NMR. Further, a ratio of rac:meso in the filter cake was also examined.

Example 2

0.52 M toluene was added to 10 g of the mixture of Synthesis Example 1, and dissolved at 60° C. for 1 hr. Thereafter, 0.52 M hexane was added thereto, followed by stirring for 30 min. Then, the temperature was decreased to 25° C., and maintained for 72 hr. A supernatant was obtained by decantation, and a filter cake was separated through a filter. The supernatant and filtrate were collected together and vacuum-dried. After completing the solvent drying, a ratio of rac:meso was examined by NMR. Further, a ratio of rac:meso in the filter cake (solid phase) was also examined.

Example 3

0.52 M toluene was added to 10 g of the mixture of Synthesis Example 1, and dissolved at 40° C. for 1 hr. Thereafter, 0.52 M hexane was added thereto, followed by stirring for 30 min. Then, the temperature was decreased to −25° C., and maintained for 72 hr. A supernatant was obtained by decantation, and a filter cake was separated through a filter. The supernatant and filtrate were collected together and vacuum-dried.

To 3.7 g of the mixture thus obtained, 0.52 M toluene was added, and dissolved at 40° C. for 1 hr. Thereafter, 0.52 M hexane was added thereto, followed by stirring for 30 min. Then, the temperature was decreased to −25° C., and maintained for 72 hr. A supernatant was obtained by decantation, and a filter cake was separated through a filter. The supernatant and filtrate were collected together and vacuum-dried. After completing the solvent drying, a ratio of rac:meso was examined by NMR. Further, a ratio of rac:meso in the filter cake was also examined.

Example 4

0.52 M toluene was added to 10 g of the mixture of Synthesis Example 1, and dissolved at 60° C. for 1 hr. Thereafter, 0.52 M hexane was added thereto, followed by stirring for 30 min. Then, the temperature was decreased to −25° C., and maintained for 72 hr. A supernatant was obtained by decantation, and a filter cake was separated through a filter. The supernatant and filtrate were collected together and vacuum-dried.

To 3.9 g of the mixture thus obtained, 0.66 M toluene was added, and dissolved at 60° C. for 1 hr. Thereafter, 0.66 M hexane was added thereto, followed by stirring for 30 min. Then, the temperature was decreased to −25° C., and maintained for 72 hr. A supernatant was obtained by decantation, and a filter cake was separated through a filter. The supernatant and filtrate were collected together and vacuum-dried. After completing the solvent drying, a ratio of rac:meso was examined by NMR. Further, a ratio of rac:meso in the filter cake was also examined.

Example 5

0.52 M toluene was added to 10 g of the mixture of Synthesis Example 1, and dissolved at 60° C. for 1 hr. Thereafter, 0.52 M hexane was added thereto, followed by stirring for 30 min. Then, the temperature was decreased to −25° C., and maintained for 72 hr. A supernatant was obtained by decantation, and a filter cake was separated through a filter. The supernatant and filtrate were collected together and vacuum-dried.

To 3.9 g of the mixture thus obtained, 0.52 M toluene was added, and dissolved at 60° C. for 1 hr. Thereafter, 0.52 M hexane was added thereto, followed by stirring for 30 min. Then, the temperature was decreased to −25° C., and maintained for 72 hr. A supernatant was obtained by decantation, and a filter cake was separated through a filter. The supernatant and filtrate were collected together and vacuum-dried. After completing the solvent drying, a ratio of rac:meso was examined by NMR. Further, a ratio of rac:meso in the filter cake was also examined.

Example 6

0.52 M toluene was added to 10 g of the mixture of Synthesis Example 1, and dissolved at 60° C. for 1 hr. Thereafter, 0.52 M hexane was added thereto, followed by stirring for 30 min. Then, the temperature was decreased to −25° C., and maintained for 72 hr. A supernatant was obtained by decantation, and a filter cake was separated through a filter. The supernatant and filtrate were collected together and vacuum-dried.

To 3.9 g of the mixture thus obtained, 0.4 M toluene was added, and dissolved at 60° C. for 1 hr. Thereafter, 0.4 M hexane was added thereto, followed by stirring for 30 min. Then, the temperature was decreased to −25° C., and maintained for 72 hr. A supernatant was obtained by decantation, and a filter cake was separated through a filter. The supernatant and filtrate were collected together and vacuum-dried.

After completing the solvent drying, a ratio of rac:meso was examined by NMR. Further, a ratio of rac:meso in the filter cake was also examined.

Comparative Example 1

0.52 M toluene was added to 10 g of the mixture of Synthesis Example 1, followed by stirring for 30 min. Then, the temperature was decreased to −25° C., and maintained for 72 hr. A supernatant was obtained by decantation, and a filter cake was separated through a filter. The supernatant and filtrate were collected together and vacuum-dried. After completing the solvent drying, a ratio of rac:meso was examined by NMR. Further, a ratio of rac:meso in the filter cake was also examined.

Comparative Example 2

1.0 M DCM was added to 10 g of the mixture of Synthesis Example 1, followed by stirring for 30 min. Then, the temperature was decreased to −25° C., and maintained for 72 hr. A supernatant was obtained by decantation, and a filter cake was separated through a filter. The supernatant and filtrate were collected together and vacuum-dried. After completing the solvent drying, a ratio of rac:meso was examined by NMR. Further, a ratio of rac:meso in the filter cake was also examined.

Recrystallization conditions and changes in the ratio of rac:meso in Examples and Comparative Examples are shown in Table 1 below.

TABLE 1

| | Recrystallization conditions | | | Molar ratio of racemic form to meso isomer (rac:meso) | | | |
| | | | | | Solid phase | Liquid phase | |
| No. | Solvent | Temperature | Number of times | Before recrystallization | after recrystallization | after recrystallization | Yield (%) |
| --- | --- | --- | --- | --- | --- | --- | --- |
| Example 1 | Tol/Hex | 60° C./−25° C. | 1 | 2 | 2 | 7 | 39 |
| Example 2 | Tol/Hex | 60° C./−25° C. | 1 | 2 | 1 | 17 | 35 |
| Example 3 | Tol/Hex | 40° C./−25° C. | 2 | 2 | 0.6 | 11 | 29 |
| Example 4 | Tol/Hex | 60° C./−25° C. | 2 | 2 | 1 | 9 | 25 |
| Example 5 | Tol/Hex | 60° C./−25° C. | 2 | 2 | 0.2 | 16 | 27 |
| Example 6 | Tol/Hex | 60° C./−25° C. | 2 | 2 | 1.8 | 8 | 35 |
| Comparative Example 1 | Toluene | −25° C. | 1 | 2 | 2 | 2.1 | 40 |
| Comparative Example 2 | DCM | −25° C. | 1 | 2 | 4 | 1.6 | 10 |

(In Table 1, the yield means a total yield from a synthesis starting material (indene derivative).)

Referring to Table 1, Examples 1 to 6, in which recrystallization was performed using the mixed solvent of toluene/hexane, showed the remarkably increased molar ratio of the racemic form in the filtrate after recrystallization, i.e., in the liquid-phase, as compared with that before recrystallization, and also showed the high yield.

Comparative Example 1, in which recrystallization was performed using the toluene solvent alone, showed the slightly high yield, as compared with Examples, but showed a change in the molar ratio of the racemic form from 2 to 2.1, indicating little effect of increasing the racemic form. Comparative Example 2, in which the racemic form was separated in a solid phase using the DCM solvent, showed an increase in the molar ratio of the solid-phase racemic form from 2 to 4, but showed the very low yield of 10%.

Preparation Example of Supported Catalyst

Supported catalysts were prepared using each of the catalysts obtained in Examples, as follows.

Preparation Example 1

10 g of silica and 10 wt % of methylaluminoxane (67 g) were put in a 300 mL reactor, and allowed to react at 90° C. for 24 hr. After precipitation, the supernatant was removed, and the precipitate was washed with toluene twice. The metallocene catalyst (580 mg) of Example 1 was diluted with toluene, which was then added to the reactor, and allowed to react at 70° C. for 5 hr. When precipitation was completed after reaction, the supernatant was removed, and the remaining reaction product was washed with toluene, and then washed with hexane, and vacuum-dried to obtain 15 g of a silica supported metallocene catalyst in a solid particle shape.

Preparation Example 2

A supported metallocene catalyst was prepared in the same manner as in Preparation Example 1, except that the metallocene catalyst of Example 6 was used.

Preparation Example 3

A supported metallocene catalyst was prepared in the same manner as in Preparation Example 1, except that the metallocene catalyst of Example 3 was used.

Preparation Example 4

A supported metallocene catalyst was prepared in the same manner as in Preparation Example 1, except that the metallocene catalyst of Example 5 was used.

Comparative Preparation Example 1

A supported metallocene catalyst was prepared in the same manner as in Preparation Example 1, except that the metallocene catalyst obtained in a solid phase in Comparative Example 2 was used.

Polymerization Examples of Propylene

Examples 7 to 10 and Comparative Example 3

A 2 L stainless reactor was vacuum-dried at 65° C., and then cooled. 3 mmol of triethylaluminum was injected at room temperature, and 1500 ppm of hydrogen was injected, and then 770 g of propylene was injected thereto, followed by stirring for 5 min. 30 mg of each of the supported metallocene catalysts obtained in Preparation Examples 1 to 4 and Comparative Preparation Example 1 was injected into the reactor under nitrogen pressure. Thereafter, the reactor temperature was slowly raised to 70° C., and polymerization was allowed for 1 hr. After completing the reaction, unreacted propylene was vented.

Experimental Example

The polypropylenes prepared in Polymerization Examples were measured for the following physical properties, and the results are shown in Table 2 below.

(1) Catalytic activity: a ratio of the weight (kg) of the produced polymer to the amount of the used catalyst (g of catalyst) was calculated, based on unit time (h).

(2) Xylene solubles (XS) of polymer: xylene was added to the sample, and pretreated by heating at 135° C. for 1 hr and cooling for 30 min. The pretreated sample was measured in OmniSec (FIPA manufactured by Viscotek Corp.) at a flow rate of 1 ml/min, and a refractive index peak area was calculated.

TABLE 2

| | Used catalyst | Molar ratio of racemic form to meso isomer (rac:meso) | Polymerization activity (kg-PP/g-cat. hr) | Xylene solubles (XS) (%) |
|---|---|---|---|---|
| | Supported catalyst | | | |
| Example 7 | Preparation Example 1 | 7 | 3.0 | 1.45 |
| Example 8 | Preparation Example 2 | 8 | 6.3 | 1.1 |
| Example 9 | Preparation Example 3 | 11 | 7.2 | 0.7 |
| Example 10 | Preparation Example 4 | 16 | 10.2 | 0.7 |
| Comparative Example 3 | Comparative Preparation Example 1 | 4 | 1.5 | 8 |

Referring to Table 2, according to the preparation method of the present invention, the supported metallocene catalyst having a high molar ratio of the racemic form were obtained. It was confirmed that when the supported metallocene catalyst obtained by the preparation method was used to polymerize polypropylene, polypropylene having low xylene solubles were prepared with high activity.

However, the catalyst of Comparative Preparation Example 1 had the high content of the meso isomer, and thus when the catalyst of Comparative Preparation Example 1 was used to polymerize polypropylene, the catalytic activity was low, and xylene solubles were high, leading to mass polymerization of atactic polypropylene.

The invention claimed is:

1. A method of preparing polypropylene, the method comprising the step of polymerizing monomers including propylene in the presence of a supported metallocene catalyst, wherein the supported metallocene catalyst is prepared by the method comprising the steps of:
preparing a mixture of a first compound of the following Chemical Formula 1 and a second compound of the following Chemical Formula 2, wherein the first compound of Chemical Formula 1 and the second compound of Chemical Formula 2 are in a ratio of about 1:1 to about 3:1 in the mixture;
adding toluene to the mixture at a first temperature to dissolve the mixture;
adding hexane thereto at a second temperature lower than the first temperature to obtain a resultant mixture;
filtering the resultant mixture to remove a solidified compound of Chemical Formula 2; and
removing the toluene and the hexane from the filtered mixture to obtain a resulting product, and then supporting the resulting product onto a carrier,

[Chemical Formula 1]

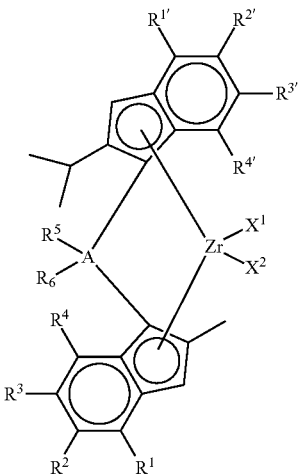

[Chemical Formula 2]

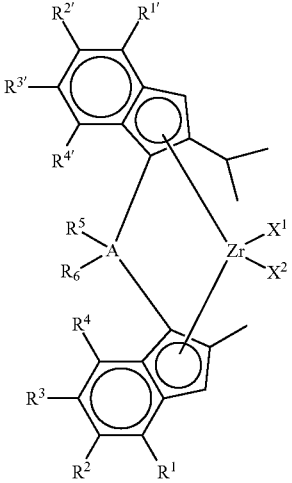

in Chemical Formulae 1 and 2,
$X^1$ and $X^2$ are each independently halogen,
$R^1$ and $R^{1\prime}$ are each independently a tert-butyl-substituted phenyl group,
$R^2$, $R^3$, $R^4$, $R^{2\prime}$, $R^{3\prime}$, and $R^{4\prime}$ are each independently hydrogen, halogen, an alkyl group having 1 to 20 carbon atoms,
A is carbon, silicon, or germanium, and
$R^5$ and $R^6$ are each independently an alkyl group having 1 to 20 carbon atoms.

2. The method of preparing polypropylene according to claim 1, wherein the monomers further include at least one selected from ethylene, 1-butene, 1-pentene, 4-methyl-1- pentene, 1-hexene, 1-heptene, 1-octene, 1-decene, 1-undecene, 1-dodecene, 1-tetradecene, 1-hexadecene, or 1-eicosene.

3. The method of preparing polypropylene according to claim 1, wherein the polypropylene is an isotactic polypropylene.

4. The method of preparing polypropylene according to claim 1, wherein the first compound of Chemical Formula 1 is represented by:

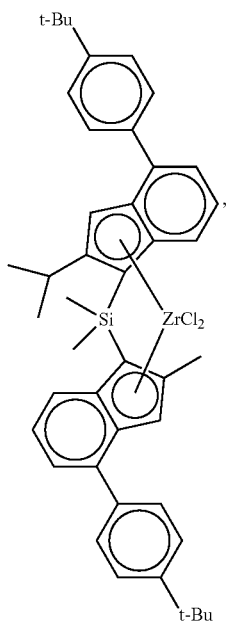

and the second compound of Chemical Formula 2 is represented by:

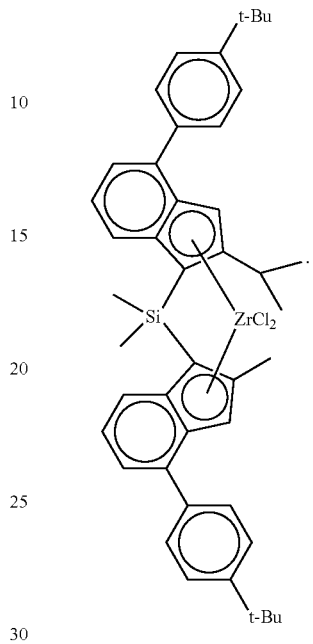

* * * * *